US005605316A

United States Patent [19]

Kelley

[11] Patent Number: 5,605,316

[45] Date of Patent: Feb. 25, 1997

[54] EQUIPMENT SECURITY APPARATUS

[75] Inventor: Donald W. Kelley, Fremont, Calif.

[73] Assignee: Qualtec Data Products, Inc., Fremont, Calif.

[21] Appl. No.: 250,523

[22] Filed: May 27, 1994

[51] Int. Cl.[6] .......... F16M 13/00

[52] U.S. Cl. .......... 248/551; 70/58

[58] Field of Search .......... 248/551, 552, 248/553; 211/4, 7, 124; 109/50, 52; 70/58, 59, 62

[56] References Cited

U.S. PATENT DOCUMENTS

| | | | |
|---|---|---|---|
| 4,248,067 | 2/1981 | Sears | 70/58 |
| 4,325,531 | 4/1982 | Omholt | 248/553 |
| 4,712,763 | 12/1987 | Leite | 248/553 |
| 4,973,023 | 11/1990 | O'Neill | 248/551 |
| 5,142,888 | 9/1992 | Ling | 70/26 |
| 5,228,658 | 7/1993 | Kelley | 248/551 |

*Primary Examiner*—Korie Chan
*Attorney, Agent, or Firm*—Fliesler, Dubb, Meyer & Lovejoy

[57] ABSTRACT

An equipment security apparatus having a first locking member including a disc-shaped member for attaching the first locking member to a surface of an object to be secured and a locking pin extending outwardly therefrom, the locking pin being terminated by an enlarged end portion and a second locking member including a box-shaped housing having a mounting surface for attaching the second locking member to a surface to which the object is to be secured and a key actuated locking bar which is rotatable from an open position to a closed position when the key is rotated for capturing the enlarged end portion of the locking pin when the locking pin is inserted in a hole provided therefor in the second locking member.

4 Claims, 3 Drawing Sheets

EQUIPMENT SECURITY APPARATUS

BACKGROUND OF THE INVENTION

1. Field of the Invention

The present invention relates to equipment security apparatus in general and in particular to apparatus for locking equipment to a horizontal or vertical surface.

2. Description of the Related Art

Office equipment, such as desktop central processing units, file servers, tower-type personal computers, laser printers, facsimile machines, desktop copy machines, entertainment equipment, such as television sets in hotel, motel and hospital rooms, and numerous other types of equipment and apparatus, such as found in laboratories, which are relatively light weight and small in size are susceptible of being stolen when left unattended for even brief periods of time.

Among the various types of lockable security apparatus that have been proposed to prevent thefts of equipment such as described above is apparatus comprising equipment mounted members which have outwardly extending appendages and surface mounted members which comprise means for engaging the appendages and locking the equipment to the surface mounted members. Illustrative of such apparatus is the apparatus disclosed in U.S. Pat. No. 5,228,658 which was granted to applicant on Jul. 20, 1993.

In the patent there is disclosed an equipment security apparatus comprising a pair of locking members, one of the locking members comprises a disc-shaped member for attaching the locking member to a surface of an object to be secured and a locking pin extending outwardly therefrom, the locking pin being terminated by an enlarged end portion. The other locking member comprises a box-shaped housing having a mounting surface for attaching the locking member to a surface to which the object is to be secured and a key actuated locking bar which is rotatable from an open position to a closed position when the key is rotated for capturing the enlarged end portion of the locking pin when the locking pin is inserted in a hole or slot provided therefor in the locking member.

A disadvantage of the patented apparatus is that by pulling, twisting and prying the equipment secured by the two locking members, it has been found that it is possible to separate the two locking members.

SUMMARY OF THE INVENTION

In view of the foregoing, a principal object of the present invention is an improved equipment security apparatus for removably locking equipment to a surface. The equipment may comprise, for example, office equipment such as desktop central processing units, file servers, tower-type personal computers, laser printers, facsimile machines and desktop copy machines. The apparatus also may be used for securing entertainment equipment such as television sets found in hotel, motel and hospital rooms, as well as other types of equipment and apparatus such as found in laboratories which are generally relatively light-weight and susceptible of being stolen if left unattended for even short periods of time.

In the apparatus there is provided a pair of box-shaped members which are attached to a mounting surface as by an adhesive strip or mounting screws and two pair of locking members which are attached to the equipment to be secured as by glue such as super bonder made by Loctite, Newington, Conn. Each of the box-shaped members comprises a cover member and a base member and a row of pin receiving holes in the top thereof. Each of the equipment mounted locking members generally comprises a circular disc-shaped member. A locking pin extends outwardly from the central portion thereof and is terminated by an enlarged end portion. In each of the surface mounted box-shaped members there is provided an elongated key-operated L-shaped locking bar. The locking bar, which is rotatable between an unlocking position and a locking position when a key-operated lock is rotated, is located in the housing beneath the row of locking pin holes in the top of each of the box-shaped members and comprises a row of notches along an edge thereof which are in registration with corresponding ones of the holes when the bar is in its locking position.

In use, when the locking pins extending from the equipment mounted locking members are inserted in a respective one of the locking pin holes, the key is rotated, rotating the locking bar from an unlocking position to a locking position wherein it captures the enlarged end portion of the locking pins.

Another feature of the present invention is that the locking pin member is attached to the disc member in each of the equipment mounted locking members in such a manner so as to permit the removal of the locking pin member therefrom. By providing for the removal of the locking pin member from the disc member, the disc members may be used in the fashion of a conventional foot member to support the equipment on a table top, desk, counter or the like, when the locking pin member is removed therefrom.

In addition to the above advantages, the apparatus of the present invention provides a low profile which is nearly invisible when used to secure equipment to a surface. It can be used for top or side mounting, requires no special tools for installation and no modification to equipment. It is easy to disconnect, highly resistant to tampering, versatile, easy and quick to install, will not void manufacturer's warranties and allows for equipment repairs to be done quickly.

Furthermore, in comparison to the apparatus disclosed in applicant's above-identified U.S. patent, the apparatus of the present invention is significantly easier to assemble. The lock is attached to the locking bar before the bar is placed in the housing. The bar and locks are then simply laid in the base of the housing and the cover attached thereto.

The notches in the bar and holes in the cover of the present invention provide a much greater holding capacity than the bar, hole and slot in applicant's patented apparatus. In the present invention, the bar pushes the pin in the equipment mounted locking members to the far side of a hole, thereby preventing its removal therefrom by twisting, prodding and pulling.

The result of the above described improvements is a 50% reduction in the cost of manufacture with no loss in integrity.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENTS

Figure 1:
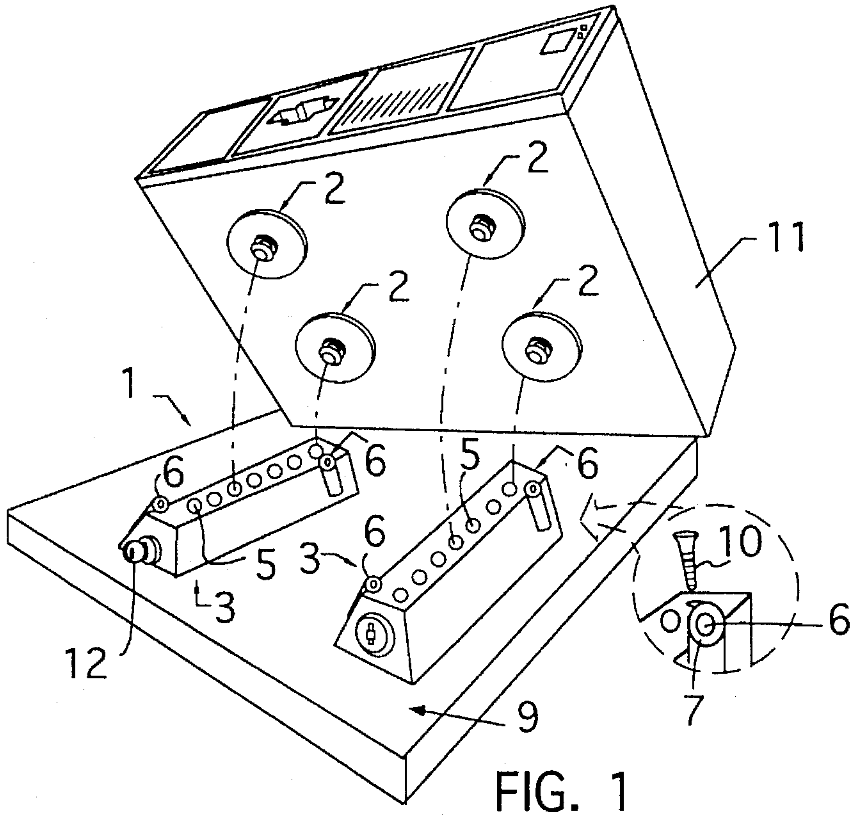
FIG. 1 is a perspective view of a computer and equipment security apparatus according to the present invention.

Referring to FIG. 1, there is provided an equipment security apparatus according to the present invention designated generally as 1. In the apparatus 1 there is provided a plurality of equipment mounted first locking members designated generally as 2 and a plurality of surface mounted, elongated, box-shaped second locking members designated generally as 3. As will be further described below, each of the locking members 2 comprises a pad member 2A and an outwardly extending locking pin member 4. In each of the locking members 3 there is provided a row of locking pin holes 5, as well as a pair of screw receiving holes 6 for mounting the locking members 3 to a horizontal or vertical surface 9 as by mounting screws 10.

Referring to FIGS. 2–5, there is provided in each of the elongated box-shaped locking members 3 a first open walled box-shaped cover member 15, a base member 16 and a key actuated elongated L-shaped locking bar 17 as will be described in more detail below.

Figure 5:
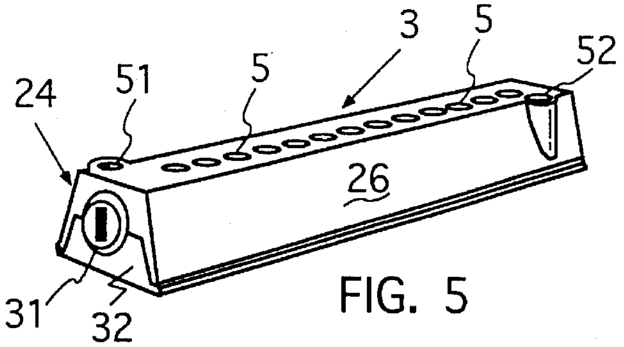
FIG. 5 is a perspective view of an assembled box-shaped member according to the present invention.

In the member 15 there is provided a top wall 23, a first end wall 24, a second end wall 25 and a pair of side walls 26, 27. The member 15 is open at the bottom and has a generally trapezoidal shape. The first end wall 24 is provided with opening 30 for receiving a part of a locking mechanism 31 on one end of the locking bar 17 and a first end wall 32 or a first end of the base member 16 as shown in FIG. 5. The second end wall 25 is provided with a corresponding opening (not shown) for receiving a second end wall 33 of the base member 16. The end walls 32 and 33 extend upwardly from a base plate 34 of the base member 16.

Extending inwardly from the end wall 33 there is provided a locking bar supporting post or pin 35 which is received in a hole 36 provided therefore in an end wall 37 of the locking bar 17.

Figure 2:
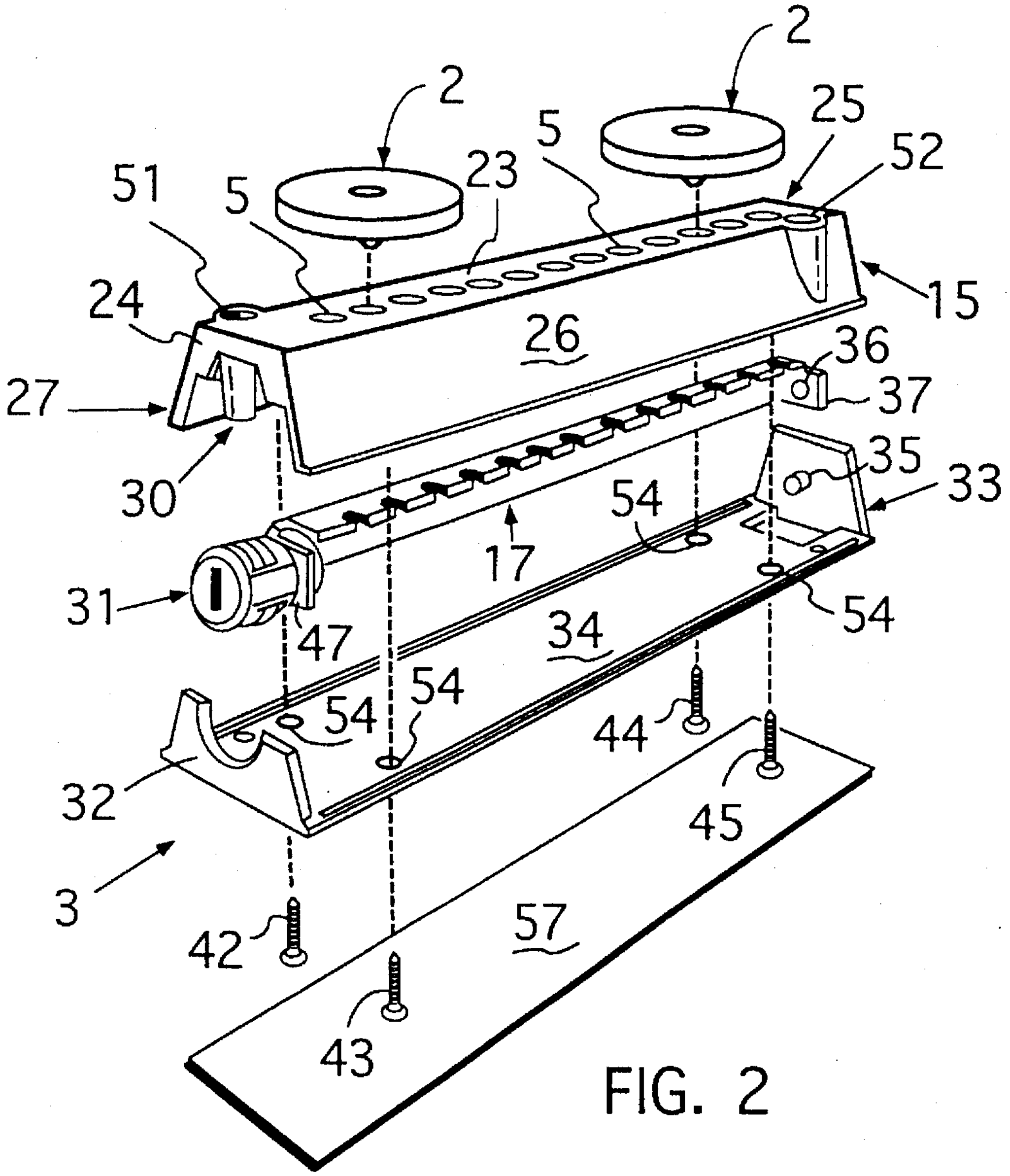
FIG. 2 is an exploded perspective view of a box-shaped locking member and disc-shaped equipment mounted member according to the present invention.
Figure 3:
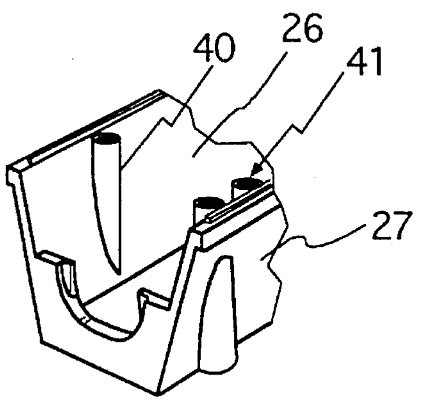
FIG. 3 is a partial perspective bottom and end of a cover member according to the present invention.

Extending downwardly from the top wall 23 of the cover member 15 there is provided a pair of downwardly extending screw receiving posts 40, 41 which, as will be described below, are used for attaching the plate member 16 to the member 15 by means of screws 42, 43 as shown in FIGS. 2 and 3. A second pair of screw receiving posts (not shown) is used by screws 44 and 45. There is also provided a pair of screw receiving posts 51, 52.

In an end wall 47 of the locking bar 17 there is provided a non-circular locking mechanism receiving hole (not shown) for receiving the interior end of the locking mechanism 31, as shown in FIGS. 2 and 3. The locking mechanism 31 is retained in the hole in a conventional manner as by a retaining clip or nut.

The cover member 15 and base member 16 are zinc castings which are approximately 7 inches long, 1.625 inches wide at the base, 1.125 inches wide at the top and 1.125 inches high.

Figure 4:
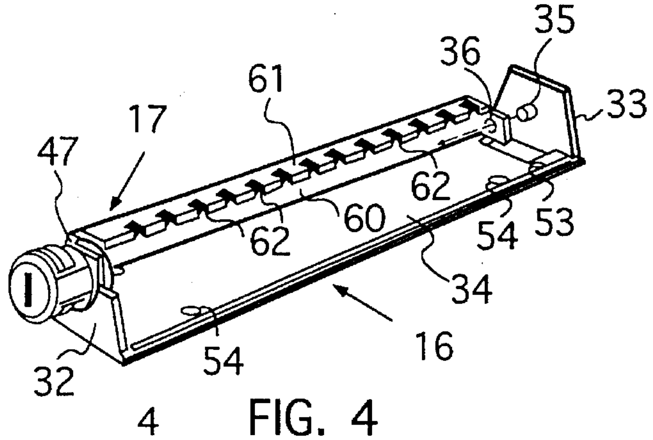
FIG. 4 is a perspective view of a base member and locking bar according to the present invention.
Figure 6:
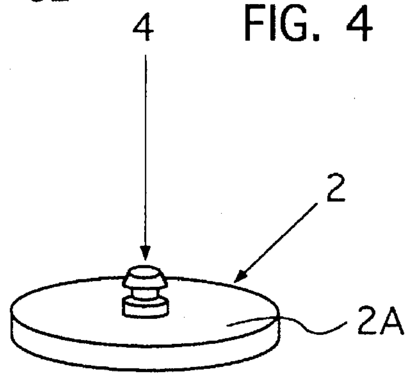
FIG. 6 is a perspective view of a disc shaped locking member according to the present invention.

Referring to FIG. 4, there is provided in the plate member 16 a pair of holes 53 (only one of which is shown) which are located to be in registration with screw receiving posts 51 and 52, respectively, and four holes 54 which are in registration with posts 40 and 41, and two other posts, not shown, respectively, in member 15. A rectangular adhesive strip 57 having a high holding strength, e.g. 80 psi, such as is made by 3M, Minneapolis, Minn., is provided on the outside surface of the plate member 16 to attach the members 3 to a surface after the plate member 16 is screwed to the cover member 15 as shown in FIG. 5.

Referring to FIGS. 2–3, there is provided in the elongated key-actuated L-shaped locking bar 17 an elongated rectangular wall 60 and perpendicular thereto an elongated rectangular wall 61. Wall 60 is approximately 6 inches long and 0.390 inches wide. Wall 61 is approximately 6 inches long and 0.66 inches wide. Located at opposite ends of the walls 60, 61 and perpendicular thereto there is provided the pair of end wall 37, 47. In the edge of the wall 61 there is provided a plurality of notches 62 which are in registration with holes 5 when the bar 17 is rotated from its unlocking position to its locking position. In the end wall 37 there is provided the circular hole 36 for receiving the locking bar supporting post 35 as shown in FIGS. 2 and 4. In the end wall 47 there is provided the square hole (not shown) for receiving a correspondingly shouldered end portion of the locking mechanism 31. Each side of the square hole is approximately 0.35 inches long.

Figure 7:
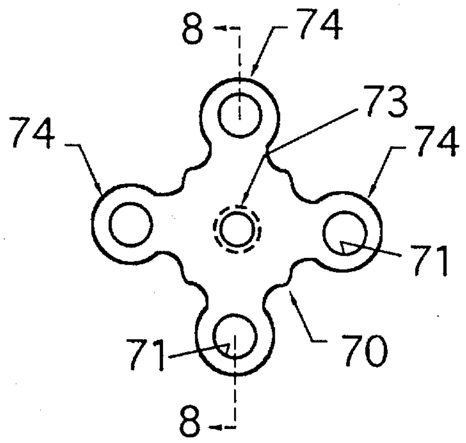
FIG. 7 is a plan view of the disc-shaped member of FIG. 8.
Figure 8:
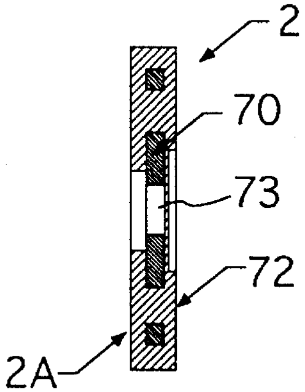
FIG. 8 is a cross-sectional view taken in the direction of lines 8—8 of FIG. 7.

Referring to FIGS. 7–8, the pad member 2A in each of the locking members 2 comprises a four leaf clover-shaped steel disc 70 comprising four petal-like portions 74 in which there is provided a plurality of holes 71 as shown and described in applicant's U.S. patent application Ser. No. 07/985,009 filed Dec. 2, 1992. The disc 70 is encased within a material 72 such as neoprene. In the center of the disc 70 there is provided a threaded hole 73.

Figure 9:
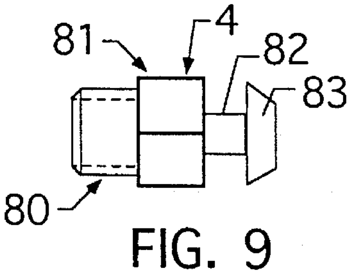
FIG. 9 is a side view of a locking pin according to the present invention.
Figure 10:
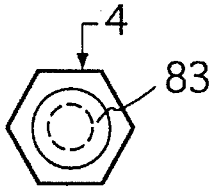
FIG. 10 is an end view of FIG. 9.

Referring to FIGS. 9 and 10, there is provided in the locking pin 4 a threaded portion 80, a hexagonal shouldered portion 81, a narrow portion 82 which is terminated by an enlarged beveled end portion 83. The major diameters of the portions 81 and 83 are approximately 0.28 inches. The diameter of the narrow portion 82 is approximately 0.125 inches. The threaded portion 80 is provided for removably screwing the locking pin 4 into the threaded bore 73 of the disc member 2.

Referring again to FIG. 1, to use the equipment security apparatus 1 of the present invention, two of the disc members 2 are locked into selected holes 5 in each of two of the members 3. The equipment to be secured is then turned over to expose the base thereof. The disc members 2 in its locked position with the members 3 are then placed on the base and the position of the disc members 2 on the base marked as by a pencil. If necessary the disc members 2 may be moved. Thereafter the disc members 2 are removed from the members 3 and are attached to the equipment to be secured as by a glue having a high holding strength, such as super bond made by Loctite, Newington, Conn.

As indicated a pair of discs 2 is associated with each one of the locking members 3 and may be mounted to the equipment 11 at various distances apart to accommodate available mounting surfaces on the equipment 11. It will be appreciated, however that the flexibility of mounting the discs 2 to the equipment 11 which is provided by the holes 5 in each of the members 3 also permits the members 3 and their corresponding disc members 2 to be mounted in non-parallel orientations.

The members 3 may be mounted to the surface 9 by means of the screws 10, as described above, or alternatively by means of the adhesive strip 57 which as indicated has a high holding strength, e.g. 80 psi, such as made by 3M, Minneapolis, Minn.

With the locking bar in its open position, the locking pin members 4 of the discs 2 are inserted in the holes 5 of the members 3. Thereafter, a key 12 is inserted in the locking mechanism 31 and rotated causing the locking bar 17 to be rotated from its unlocking position to its locking position wherein the enlarged end 83 of the locking pin 4 as shown in FIG. 9 is captured in one of the notches 62. The notches 62 in the locking bar 61 and holes 5 in the cover 23 provide a much greater holding capacity than the bar, hole and slot in applicant's patented apparatus. The locking bar 61 pushes the pin member 4 in the equipment mounted locking members 2 to the far side of a hole 5, thereby preventing its removal therefrom by twisting, prodding and pulling. To unlock the apparatus, the rotation of the key 12 is reversed.

Another important feature of the present invention is that if it becomes necessary to remove the equipment 11 from the locking members 3, it is possible to unscrew the locking pins 4 from each of the disc members 2 so that the disc members 2 may be used in the fashion of a conventional foot member to support the equipment 2 on a table top, desk, or the like, without damaging the surface thereof.

While preferred embodiments of the present invention are described above, it is contemplated that numerous modifications may be made thereto for particular applications without departing from the spirit and scope of the present invention. For example, the holes 5, shown as a round hole, may be any suitable shape, including a slot-like shape, so long as it is compatible with the locking features of the present invention. Similarly, the metallic disc 70 need not be round but may be any suitable shape. Accordingly, it is intended that the embodiments described be considered only as illustrative of the present invention and that the scope thereof should not be limited thereto but be determined by reference to the claims hereinafter provided.

What is claimed is:

1. An equipment security apparatus for securing a first object to a second object comprising:

A) a first assembly including:

1) an attachable member having a first surface for use in attaching said the first assembly to the first object; and 2) a pin member terminated by an enlarged end portion extending outwardly therefrom; and B) a second assembly including:

1) an end hole defined at an end of the second assembly, 2) a housing comprising:

a) a base member having i) a bottom plate member, ii) a first end wall having an opening therein defining a portion of the end hole of the second assembly, and iii) a second end wall having a pin means extending inwardly therefrom;

b) an elongated U-shaped cover member having i) a plurality of pin receiving holes, ii) first and second side walls, iii) a first end wall having an opening therein defining another portion of the end hole of the second assembly and mating with the first end wall of the base member such that the opening of the base member first end wall is aligned with the opening of the cover member first end wall to define the end hole, iv) a second end wall having an opening therein for mating with the second end wall of the base member, and c) means for connecting the cover member to the base plate member;

3) a locking bar having a) a plurality of notches along an edge of the locking bar, b) a first end wall having a first hole, and c) a second end wall having a second hole for receiving the pin means; and 4) a locking mechanism which extends through the end hole into the housing where the locking mechanism and the end hole is shaped so as to prevent relative rotation of the locking mechanism with reference to the housing, the locking mechanism having a) a rotatable means which extends from the locking mechanism and engages the first hole of the locking bar for rotating the locking bar within the housing beneath the plurality of pin receiving holes between a locking position and an unlocking position; and 5) means for attaching the second assembly to the second object; and the first assembly is securely connected to the second assembly when the locking bar is rotated from the unlocking position to the locking position by the plurality of notches capturing the enlarged end portion of the pin member inserted through one of the pin receiving holes.

2. The equipment security apparatus according to claim 1 wherein the means for attaching the base member second assembly to the second object comprises a rectangular member having adhesive on opposite surfaces thereof.

3. The equipment security apparatus according to claim 1 wherein the means for attaching the base member second assembly to the second object comprises screw means.

4. The equipment security apparatus according to claim 1 wherein the first and second side end walls of the cover member and the base member comprise mating flange members for facilitating the connecting of the cover and base members.

* * * * *